United States Patent [19]

Eberle

[11] Patent Number: 4,887,809
[45] Date of Patent: Dec. 19, 1989

[54] ENDLESS REVOLVING TRANSPORT APPARATUS FOR PIECE GOODS

[75] Inventor: Jürg Eberle, Hinwil, Switzerland

[73] Assignee: Ferag AG, Hinwil, Switzerland

[21] Appl. No.: 250,404

[22] Filed: Sep. 28, 1988

[30] Foreign Application Priority Data

Oct. 2, 1987 [CH] Switzerland .................. 3854/87

[51] Int. Cl.$^4$ ............................................ B65H 29/04
[52] U.S. Cl. .................................... 271/203; 198/792; 271/206
[58] Field of Search ............... 271/270, 277, 202, 204, 271/206, 202, 203; 198/792

[56] References Cited

U.S. PATENT DOCUMENTS 3,462,002 8/1969 Zuppiger .......................... 198/792
3,599,777 8/1971 Johnson ........................... 198/792
4,072,228 2/1978 Honegger et al. ............. 271/202 X

FOREIGN PATENT DOCUMENTS 610276 4/1979 Switzerland.

Primary Examiner—Richard A. Schacher
Attorney, Agent, or Firm—Willian Brinks Olds Hofer Gilson & Lione

[57] ABSTRACT

The transport apparatus comprises an endless guide device extending in a closed path and at which there are guided a number of entrainment elements. These entrainment elements are interconnected by a toothed belt deformed into a substantially wave-shaped configuration by attachment elements secured at the entrainment elements. At each of the starting region and terminal region of the conveying-active path of the transport apparatus, there are rotatably mounted two parallel cam discs rotatable in a predetermined direction of rotation by related drives. Recesses in the cam discs act upon the entrainment elements such that the latter are driven at the starting region and terminal region of the conveying-active path and are dispositioned in a predetermined mutual position. The spacing between the entrainment elements at the conveying-active path and at the non-conveying active path is compensated by the resilient action of the wave-shaped deformed toothed belt. Differences in the operating cadence or in the phase position between printed products delivered to the transport apparatus and outfed away therefrom are compensated by increasing or reducing the spacing between the entrainment elements.

13 Claims, 3 Drawing Sheets

ENDLESS REVOLVING TRANSPORT APPARATUS FOR PIECE GOODS

BACKGROUND OF THE INVENTION

The present invention broadly relates to material transport or conveyance apparatuses for handling various types of piece goods or products, and, in particular, relates to a new and improved construction of an endless revolving transport apparatus for piece goods, especially for printed products.

Generally speaking, the endless revolving piece good-transport apparatus of the present development is of the type comprising a number of entrainment elements which revolve or circulate in a guide device and which are coupled with one another or intercoupled by means of drag connections. These entrainment elements move through a conveying-active path having a starting region and a terminal region. At such starting region and at the terminal region of the conveying-active path of the entrainment elements, the latter are driven by a respective controllable drive device. The entrainment elements can be positioned as concerns their mutual orientation or disposition with respect to one another in order to regulate the product taken-over cadence or rate and the product outfeed or delivery cadence or rate independent of one another.

Such type of transport apparatus has become known in this technology, for instance, from Swiss Pat. No. 610,276, granted Apr. 12, 1979 and the cognate U.S. Pat. No. 4,072,228, granted Feb. 7, 1978. The entrainment elements of this transport apparatus possess undercarriages having wheels which are guided in pairs in U-shaped rails which are arranged such that their open sides or openings confront one another. At the front and rear end walls of the undercarriages, there are provided openings through which extend connection elements. These connection elements carry hooks at their opposed ends. These hooks engage about impact ledges provided at the end walls of the undercarriages. At the central region between the hooks, there are arranged buffers or shock absorbers at the connection elements. The drive of the entrainment elements is accomplished by means of worms which, at the starting region and at the terminal or end region of the conveying-active path of the transport apparatus, act upon follower rolls which are arranged at the undercarriages. The drive velocity of the first worm is governed by the infeed clock rate or cadence of the arriving printed products and the drive velocity of the second worm is governed by the clock rate or cadence for further processing of the printed products. The difference between the product conveying velocities at the starting region and at the terminal region of the conveying-active path of the transport apparatus is compensated by the drag connection. This can result in noisy travel of the entrainment elements because the acceleration and deceleration of the undercarriages occurs suddenly due to the impact or contact with the hooks or shock absorbers, as the case may be.

SUMMARY OF THE INVENTION

Therefore, with the foregoing in mind, it is an important object of the present invention to provide a new and improved construction of an endless revolving transport apparatus for piece goods which is not afflicted with the aforenoted shortcomings of the prior art.

Another and more specific object of the present invention is directed to a new and improved construction of an endless revolving piece good-transport apparatus which exhibits relatively quiet running or operating characteristics and which is relatively simple in construction and design.

Yet a further notable object of the present invention is directed to a new and improved construction of an endless revolving transport apparatus for handling piece goods, such as printed products, which is relatively simple in construction and design, quite economical to manufacture, highly reliable and not particularly noisy in operation, is not readily subject to breakdown or malfunction and requires a minimum of maintenance and servicing.

Now in order to implement these and still further objects of the invention, which will become more readily apparent as the description proceeds, the endless revolving piece good-transport apparatus of the present development, among other things, is manifested by the features that the drag connections or drag connection means between the individual entrainment elements is formed by elastic shortenable and extensible resilient or spring means.

The resilient or spring means providing the drag connection between each two neighboring entrainment elements may comprise a separate resilient or spring element. Each such elastically shortenable and enlargeable or extensible resilient or spring element exerts upon the neighboring entrainment element, a continually increasing compressive or tensile force, as the case may be, during the respective shortening and enlargement of the mutual spacing between the entrainment elements with respect to a normal spacing or mutual distance between such entrainment elements.

According to a preferred construction, the resilient or spring means comprises an integrated sequence of resilient or spring elements each constituting a bending spring which is formed by a section of an endless band. Attachment or connection elements arranged at the entrainment elements, serve for deforming the endless band so as to possess a substantially undulatory or wave-shaped configuration. Two such resilient or spring elements are arranged at each entrainment element. As to both resilient or spring elements which are arranged at an associated entrainment element, there is only required a single attachment or connection element. Since, all of the bending springs are formed by sections or portions of a single endless band, there is thus appreciably simplified the fabrication and assembly operation.

According to a further preferred embodiment of the present invention, each drive device or drive arrangement comprises at least one cam disc or wheel acting upon the entrainment elements. Each such cam disc possesses a substantially sawtooth-like circumferential profile or shape, and the steep flanks or flank portions of which lead as viewed in the direction of rotation of each such cam disc. Consequently, the transmission of forces between the cam disc and the entrainment elements is accomplished approximately in tangential direction and, additionally, the trailing flank or flank portion prevents a too early or incipient travel of the next or trailing entrainment element owing to the tensile forces which are applied by the leading entrainment element.

According to a still further preferred embodiment, each steep flank has arranged directly forwardly or downstream thereof, a recess or pocket which receives a complimentary shaped entrainment or driven member formed at each entrainment element. In this way, there can be realized an exact positioning of product grippers or gripper elements for the transported piece goods or products.

If a pair of cam discs is provided for each drive device and such cam discs and entrainment or driven members of the entrainment elements are arranged at opposite sides of the resilient means, that is to say, at opposite sides of each of the resilient or spring elements, then there is beneficially prevented any undesired canting or tilting of the entrainment elements in the guide device. Such contributes to quiet travel of the entrainment elements.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
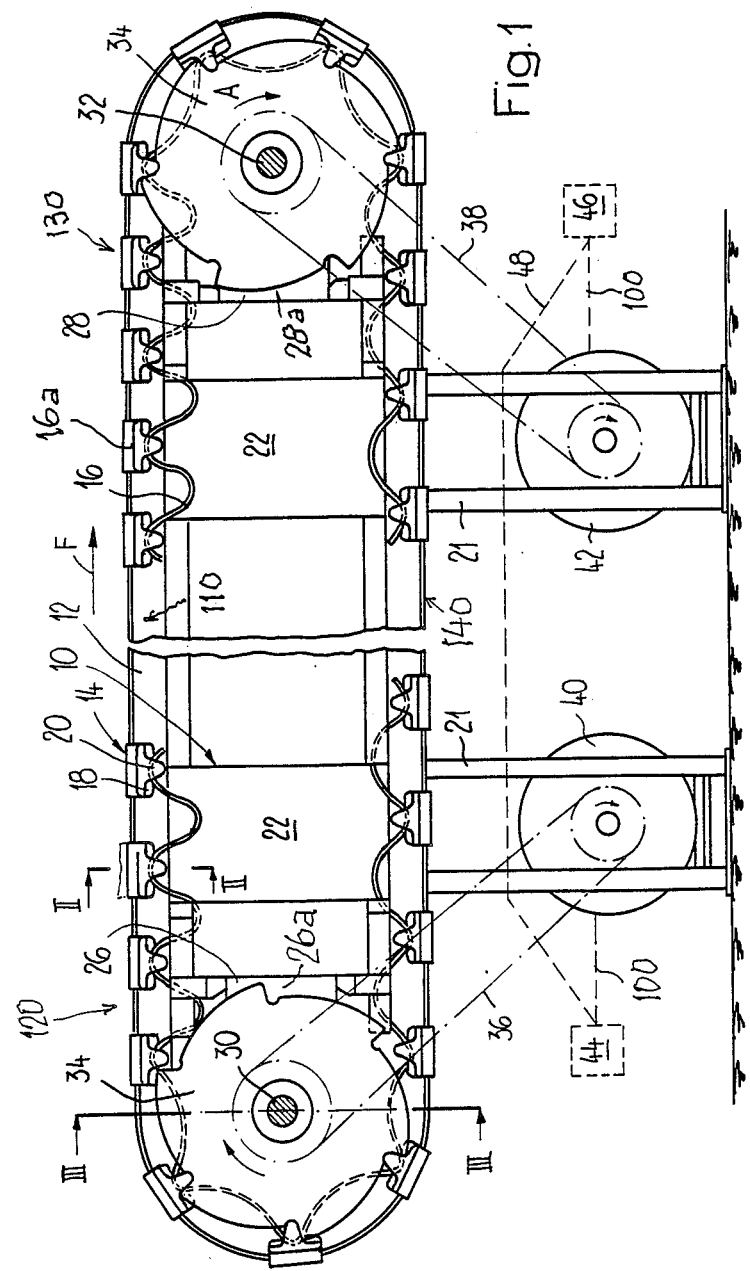
FIG. 1 illustrates in side and broken-away view, a portion of an endless revolving piece good-transport apparatus for printed products and constructed according to the present invention.

Describing now the drawings, it is to be understood that in order to simplify the illustration thereof, only enough of the structure of the endless revolving piece good-transport apparatus has been depicted therein as is needed to enable one skilled in the art to readily understand the underlying principles and concepts of the present development. Turning attention now specifically to FIG. 1 of the drawings, there has been depicted in simplified illustration and in side view, an exemplary embodiment of transport apparatus for the transport or conveyance of piece goods, products or articles, here soon to be printed products, such as newspapers, magazines, periodicals and the like. To facilitate the representation of such FIG. 1, a portion of the essentially linear intermediate or central region of such transport apparatus has been broken-away.

Continuing, it will be observed that at a frame or stand structure 10, there is arranged an endless guide or guide device 12 which is shown to have a substantially oval or loop-like configuration and at which there are slidingly mounted, a plurality of entrainment elements 14. The entrainment elements 14 are secured at a fixed mutual spacing from one another at resilient or spring means here in the form of an endless toothed belt or belt member 16. This toothed belt 16 may be formed of a belt or band composed of an elastomeric or rubber material. The toothed belt 16 is deformed in an undulatory or wave-shaped configuration by attachment or connection elements 18 arranged at the entrainment elements 14. The deformation of the toothed belt 16 into the undulatory or wave-shaped configuration is accomplished such that between each two neighboring entrainment elements 14, the bent toothed belt 16 has at least one apex or apex portion 16a. Moreover, each entrainment element 14 is here shown to be provided at each side or opposite end 16b of the toothed belt 16 with an entrainment or driven member 20.

At two pairs of uprights or columns 21 of the frame 10, there is braced or mounted a respective support element 22 at which there is appropriately affixed the guide or guide device 12. At the frame or stand structure 10, there are likewise arranged two overhang or cantilever arms or arm members 26 and 28, at each of which there is mounted an associated rotatable or rotary shaft 30 and 32, respectively. At both opposite sides 26a and 28a of the overhang or cantilever arms 26 and 28, respectively, each associated rotatable shaft 30 and 32 is rigidly connected for rotation with a cam disc or wheel 34. Moreover, the guide or guide device 12 extends at a suitable radial spacing about these cam discs 34 in order to retain the entrainment elements 14 in engagement with such cam discs 34. Each rotatable shaft 30 and 32 is operatively connected by means of the chain-dot illustrated chain drive 36 and 38 with a respective drive motor 40 and 42. FIG. 1 illustrates that each such drive motor 40 and 42 is supported at an associated one of the pairs of uprights or columns 21.

There are also provided two regulators or control devices 44 and 46 which control the rotational speed of the associated drive motor 40 and 42, respectively. This control has been symbolically portrayed by a respective broken line 100 between the regulators or control devices 44 and 46 and the related drive motors 40 and 42, respectively. A further broken line 48 represents an electrical connection between the regulators or control devices 44 and 46. The purpose of these connections will be considered hereinafter.

Figure 4:
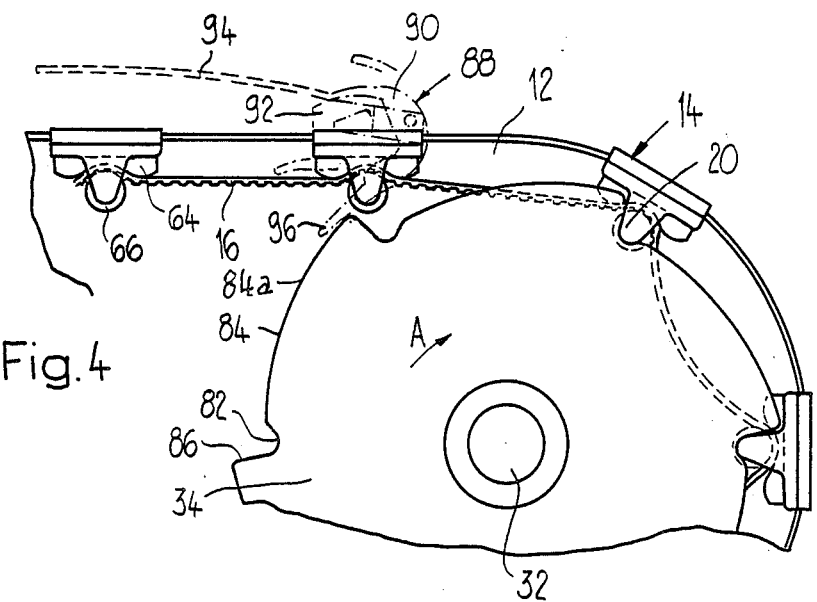
FIG. 4 is a side view depicting a portion of the right-hand part of the transport apparatus depicted in FIG. 1 and illustrating a maximum spacing between the entrainment elements and the associated product grippers.
Figure 5:
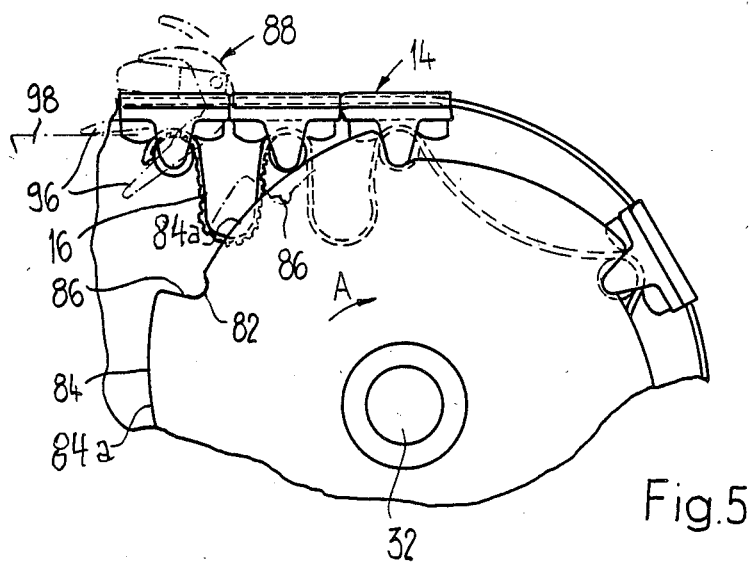
FIG. 5 is a side view of a portion of the right-hand part of the transport apparatus depicted in FIG. 1, illustrating the spacing between the entrainment elements and the associated grippers when at a minimum distance from one another.

As evident from inspecting FIGS. 4 and 5, the therein depicted reference character A designates the direction of rotation of the drive motors 40 and 42 and the associated cam discs or wheels 34. The conveying-active path 110 of the entrainment elements 14 begins at the region of the cam discs 34 arranged at the rotary or rotatable shaft 30 at the starting region 120 of the conveying-active path 110 and ends at the region of the cam discs 34 depicted at the right of the illustration of FIG. 1 defining the terminal or end region 130 where the newspapers are outfed or delivered for further processing. This conveying-active path 110 also defines the product conveying direction F.

Figure 2:
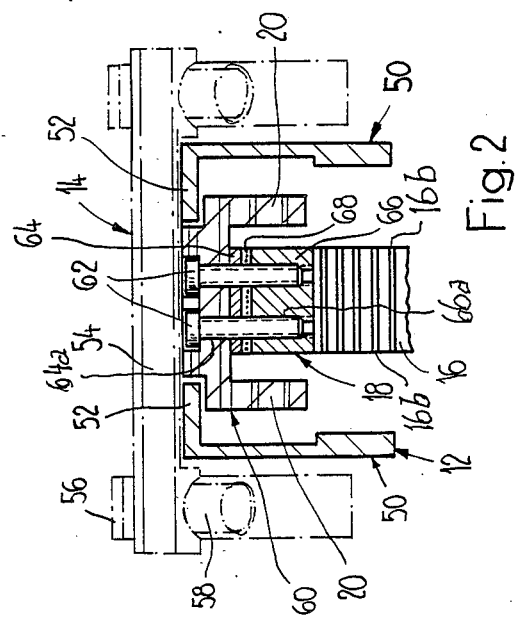
FIG. 2 illustrates on an enlarged scale, a section of the transport apparatus depicted in FIG. 1, taken substantially along the line II—II thereof.

FIG. 2 illustrates on an enlarged scale, a section through an entrainment element 14 and the guide or guide device 12 taken substantially along the line II—II of FIG. 1. This guide device 12 will be understood to comprise two substantially L-shaped profile or sectional members 50, the shorter legs 52 of which are directed towards one another. A bracket or crosspiece member 54 or equivalent structure, which has been shown in chain-dot lines in FIG. 2, slides upon these shorter legs or leg members 52. Also shown in chain-dot lines, are the product clamps or clamp members 56 which are displaceably mounted at the related bracket or crosspiece member 54 laterally of the substantially L-shaped profile members 50. These product clamps 56, defining product engaging means, are pre-biased against the associated bracket or crosspiece member 54 by means of the schematically indicated springs 58. At each bracket or crosspiece member 54, there is secured by not particularly illustrated threaded bolts or equivalent fastening expedients, a slide or sliding body or body member 60 which partially extends along the legs or leg members 52 which straddle the slide or sliding body 60. The associated entrainment or driven members 20 are formed or otherwise appropriately provided at this slide or sliding body 20. By means of two threaded bolts 62 or the like, there is secured the related attachment or connection element 18 which is arranged between these entrainment or driven members 20. Each such attachment element 18 comprises a saddle or web portion 64 provided with two throughpass holes or bores 64a for receiving the threaded bolts 62 as well as a rider or block portion 66 in which there are arranged the threads or threaded portions 66a for the threaded bolts 62. Between the saddle or web portion 64 and the rider or block portion 66, there is fixedly clamped the toothed belt 16. Reference character 68 designates inserts of the toothed belt 16 and which, for instance, comprise steel wires or the like.

Figure 3:
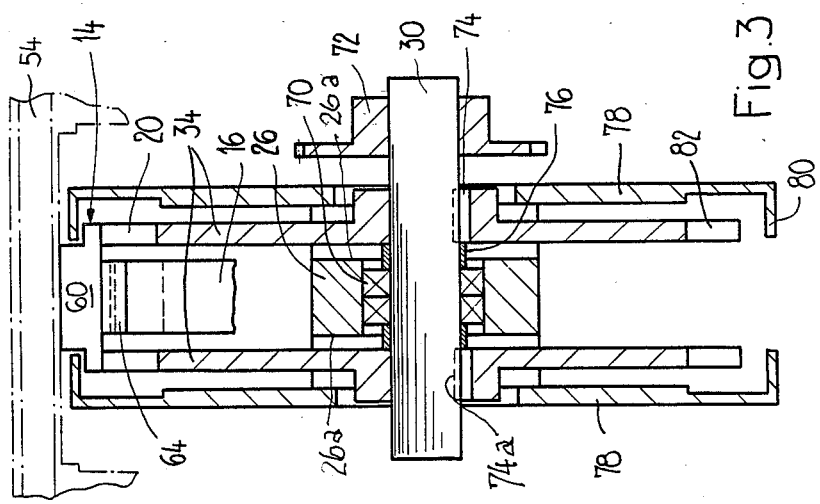
FIG. 3 illustrates, again on an enlarged scale, a section of the transport apparatus depicted in FIG. 1, taken substantially along the line III—III thereof.

FIG. 3 illustrates a section taken generally along the line III—III of FIG. 1. The rotatable shaft or shaft member 30 is rotatably mounted by means of a pair of ball bearings 70 or equivalent bearing structure in the associated overhang arm or arm member 26. A sprocket wheel 72 of the chain drive 36 is rigidly connected for rotation at the rotatable or rotary shaft 30. Two cam discs 34 are rigidly connected for rotation with the rotatable shaft 30 by means of keys or wedges 74 or the like which engage into keyways 74a provided in the rotatable shaft 30. These two cam discs 34 are spaced from the pair of ball bearings 70 by the sleeves or sleeve members 76. Also arranged at the overhang or cantilever arm 26 are two guide discs or plate members 78 which are provided at their outer edges or marginal portions 78a with further legs or leg members 80 extending in spaced facing relationship to one another and dispositioned substantially coaxially with respect to the rotatable shaft 30. These legs 80 which are provided at the guide discs 78 assume the function of guiding the entrainment elements 14 at the region of the cam discs 34 in analogous fashion as such guiding function is accomplished by the legs or leg members 52 of the substantially L-shaped profiles or profile members 50. Specifically, the legs 80 of the guide discs 78 guide the entrainment elements 14 between each spaced pair of cam discs 34 arranged at the rotatable shafts or shaft members 30 and 32.

In the upper half of the illustration of FIG. 3, there has been depicted one of the entrainment elements 14 which is slidingly guided by means of the chain-dot indicated bracket or crosspiece member 54 and the slide or sliding body 60 at the confronting legs or leg members 80. The entrainment or driven members 20 of such entrainment element 14 engage into recesses or pockets 82 or the like (see also FIGS. 4 and 5) provided at the cam discs 34. In the showing of FIG. 3, the toothed belt 16 has been fragmentarily portrayed, it being recalled that this toothed belt 16 is secured by means of the rider or block portion 66 and the saddle or web portion 64 at the slide or sliding body 60. Each of these recesses or pockets 82 is arranged directly downstream of an associated one of the neighboring steep flanks 86 as viewed with respect to the direction of rotation A of the corresponding cam disc 34. It is further to be observed that each of the entrainment or driven members 20 has a complimentary configuration or shape to the configuration or shape of the recesses or pockets 82 so that these entrainment or driven members 20 can be positively engageably received in such recesses or pockets 82.

In order to facilitate comprehension of the invention, FIGS. 4 and 5, in contrast to FIG. 1, depict a portion of the transport apparatus at the region of the rotatable or rotary shaft 32 in a markedly simplified portrayal. The cam discs 34 rigidly connected for non-relative rotational movement with the rotatable shaft 32 possess a substantially sawtooth-like circumferential profile 84, the steep flanks or flank members 86 of which, as viewed in the direction of rotation A, constitute leading flanks. Each of these steep flanks or flank members 86 has arranged downstream or directly forwardly thereof, the aforementioned recess or pocket 82. As already described above, these recesses or pockets 82 serve for the reception of the mirror-image configured or mating entrainment or driven members 20 of the entrainment elements 14. In the illustration of FIGS. 4 and 5, there have been depicted four entrainment elements 14 which are operatively interconnected with one another by the depicted resilient or spring means here constituted by the toothed belt 16 and are slidingly mounted at the guide or guide device 12.

Continuing, it will recognized from the illustration of FIG. 5, that the entrainment or driven members 20 of both entrainment elements 14 which are shown located forwardmost, as viewed with respect to the direction of rotation A of the rotatable shaft 32, engage in the recesses or pockets 82 of the cam discs 34, whereas the entrainment or driven members 20 of the next following or third entrainment element 14 has been portrayed in a position prior to engagement with the associated recesses or pockets 82. The curvature of the guide or guide device 12 governs the spacing of the entrainment elements 14 from the recesses or pockets 82 provided in the cam discs 34, whereas this curvature is governed at the region of the conveying-active and non-conveying-active paths between the cam discs 34 at the opposite ends of the transport apparatus by the number of entrainment elements 14 located at these paths (see also FIG. 1).

In the illustration of FIG. 4, the spacing between the depicted entrainment elements 14 which, however, are not in engagement with the recesses or pockets 82, is maximum, the toothed belt 16 is stretched or extended as shown, whereas in the illustration of FIG. 5, the same entrainment elements 14 have come into abutting relationship with one another and the toothed belt 16 is now deformed to assume a serpentine or undulatory configuration.

Viewed in the aforementioned direction of rotation A, which is also the conveying direction for the entrainment elements 14, it will be observed that in the illustration of FIG. 4, a product gripper element or member 88, defining a product engaging means, has been shown in chain-dot lines at the third entrainment element 14 and in FIG. 5, at the fourth entrainment element 14. Of course, it should be understood that at each entrainment element 14 there is arranged one such product gripper element 88, which, however, conveniently have not been depicted for all of the entrainment elements 14 in FIGS. 4 and 5 in order to simplify the illustration.

In particular, it will be observed that each such product gripper element or member 88 contains a product clamping finger or finger member 90 which is pivotably mounted and pre-biased against a clamping jaw or jaw member 92 in the closing direction of the product gripper element or member 88. Between the clamping finger 90 and the clamping jaw or jaw member 92, there is shown a clamped product, here for instance, a newspaper 94 in broken lines. The clamping finger 90 is equipped with a cam follower element 96 which when brought into contact with an appropriate cam or cam member 98 (see Finger 5), pivots this clamping finger 90 into its open position, with the result that the previously clamped or engaged newspaper 94 is now released. FIG. 5 also depicts in chain-dot lines, a steep flank or flank member 86 which is positionally shifted through the bisecting angle or bisector between the two steep flanks or flank members 86 which have been shown in full lines in such FIG. 5.

Based upon the illustration of the transport apparatus as shown in FIGS. 1, 4 and 5, there will now be described the function thereof in greater detail. The products, here, as stated, assumed to be newspapers 94, are transported in an imbricated or shingled product formation or stream from a not particularly illustrated infeed device to the starting or infeed region 120 of the conveying-active path of the transport apparatus. At that location, the infed newspapers 94 are engaged by the product gripper elements or members 88, conveyed or transported in the product conveying or feed direction F to the oppositely situated end or terminal region 130 of the conveying-active path 110, at that location received by a likewise not particularly illustrated outfeed or delivery conveyor for further processing. The manner of infeeding and outfeeding the printed products is quite well known in this technology and, for instance, has also been disclosed in the previously mentioned Swiss Pat. No. 610,276 and the cognate U.S. Pat. No. 4,072,228.

Continuing, it is recalled that the drive motor 40 is controlled by the regulator or control device 44 in such a fashion that in the operating cycle or cadence of the arriving imbricated stream of printed products, each product gripper element or member 88 engages an associated newspaper 94 of the imbricated product formation or stream at the starting region 120 of the conveying-active path 110 of the transport apparatus. For this purpose, the clamping fingers 90 are retained in their open position at such starting region 120 by the associated cam or cam member like the cam or cam member 98 depicted in FIG. 5.

Just as the drive motor 40 is controlled as a function of the infeed operating cadence or infeed rate of the delivered newspapers 94, equally, the drive motor 42 is controlled by the regulator or control device 46 as a function of the outfeed or delivery operating cycle or rate of the outfeed conveyor. The cam discs 34 rigidly seated for rotation upon the rotatable shaft 32 are rotated in the direction of the arrow A such that each newspaper 94 is engaged by the outfeed conveyor or equivalent outfeed transport device and appropriately transported away. Briefly occurring cadence or clock differences which might arise between the infed and outfed newspapers 94 as well as continuous phase shifts are accommodated by the transport apparatus. For this purpose, there are arranged at the guide or guide device 12, a multiplicity of the entrainment elements 14 which, as a consequence of the resilient or spring bending action of the toothed belt 16, assume in the rest state or condition, an average mutual spacing from one another such that the toothed belt 16 has imparted thereto the aforementioned undulatory or wave-shaped configuration.

If the product outfeed or delivery operating cadence or clock rate is greater than the product take-over or infeed transfer cadence or clock rate, then the spacing between the entrainment elements 14 at the conveying-active path 110 is increased and such spacing is reduced at the non-conveying active path 140 of the transport apparatus. In the event that the product take-over operating or infeed transfer cadence or rate is greater than the outfeed or delivery operating cadence or rate for the products, then there is accomplished at the conveying-active path 110, a dam-up of the entrainment elements 14, whereas the mutual spacing of these entrainment elements 14 at the non-conveying path 140 is enlarged. On the one hand, the mutual spacing between neighboring entrainment elements 14 can be increased for such length of time until the toothed belt 16 is stretched, as shown in FIG. 4, and, on the other hand, this mutual spacing between the entrainment elements 14 can be reduced until these entrainment elements 14 abut one another, as shown in FIG. 5.

The monitoring of these extreme values or extreme operational conditions is accomplished by the regulators or control devices 44 and 46 and has been symbolically indicated by the connection lines or connections 48. Thus, for instance, it is possible to integrate the difference between the rotational speeds of both of the drive motors 40 and 42 and to compare such with a maximum value and a minimum value which respectively correspond to the maximum spacing and minimum spacing between the entrainment elements 14. The transport apparatus can accommodate differences in the product take-over operating cadence and the product delivery operating cadence until exceeding or falling below one of these extreme values or window thresholds. Only at that point in time is there required a deceleration or acceleration, as the case may be, of the product take-over operating cadence or the product delivery operating cadence.

Continuing, it is to be understood that the undulatory or wave-shaped deformed toothed belt 16 functions as a resilient or bending spring between neighboring entrainment elements 14. If the mutual spacing between the entrainment elements 14 is reduced in relation to the average or mean spacing, then the section or portion of the toothed belt 16 between two neighboring entrainment elements 14 exerts a reaction force upon these entrainment elements 14 which strives to shift such two neighboring entrainment elements 14 back into their original position occupying the aforementioned average mutual spacing from one another. In the event that the spacing between two entrainment elements 14 is greater than the average spacing, in that case, the toothed belt 16 exerts a tensile or traction force as the reaction force upon the entrainment elements 14. The resilient or spring action of the toothed belt 16 thus produces the beneficial result that there is compensated the mutual spacing between the entrainment elements 14 at the conveying-active path 110 as well as at the non-conveying active path 140. Since the reaction forces in the toothed belt 16 continually or continuously vary, this compensation also occurs continually or continuously and appreciably contributes to the quiet running of the transport apparatus. In this context, it is important that the friction between the entrainment elements 14 and the guide or guide device 12 can be maintained small. For instance, if the parts of the entrainment elements 14 which slide upon the, for instance, metallic guide or guide device 12 are formed of a plastics material, then this condition can be readily fulfilled. Of course, also different material pairings can be used.

Based upon the illustrations appearing in FIGS. 4 and 5, there now will be described in greater detail the positioning of the entrainment elements 14 at the cam discs 34. In the case of maximum mutual spacing between neighboring entrainment elements 14, the entry or deposition of the entrainment or driven members 20 in the recesses or pockets 82 occurs without any problem. This is so because the spacing of the steep flanks 86 is approximately equal to the maximum spacing between the entrainment or driven members 20 with the toothed belt 16 in a stretched or extended condition. Thus, the entrainment or driven members 20 of the trailing entrainment element 14 is pulled into the related recesses or pockets 82 by the leading or downstream situated entrainment elements 14 which are already in meshing engagement with the recesses or pockets 82 provided at the cam discs 34. On the other hand, if prior to the time that the entrainment elements 14 arrive at the cam discs 34 there has formed a dam-up of the entrainment elements 14, as has been depicted in FIG. 5, then these entrainment elements 14 must be held back until there is available a next following recess or pocket 82 for the reception of an entrainment or driven member 20. For this purpose, the entrainment or driven members 20 advantageously can slide at that portion 84a of the circumferential or outer profile 84 located between the steep flank or flank member 86 and the upstream or trailing recess or pocket 82. Since the spacing of this substantially flat portion or part 84a of the circumferential profile 84 and the axis of rotation of the rotatable shaft 32 gradually decreases in a direction opposite to the direction of rotation A of such rotatable shaft 32, the dammed-up entrainment elements 14 move slowly in the direction of rotation A until the next recess or pocket 82 engages the entrainment or driven member 20 of the forwardmost dammed-up entrainment element 14 and the entrainment or driven member 20 of the next following entrainment element 14 again bears at the next flat portion or part 84a of the circumferential profile 84.

As described above, FIGS. 4 and 5 depict both of the extreme situations involving maximum mutual spacing and minimum mutual spacing between the successive entrainment elements 14. The mutual spacing between the entrainment elements 14 usually corresponds to the average mutual spacing. Also in this case, the entrainment elements 14, in each case, are slightly dammed-up or held back until the next entrainment element 14 can be engaged by the cam discs 34. Also in this situation, the continual or continuous change of the reaction forces in the toothed belt 16 ensures for quiet travel prior to the time that the entrainment or driven members 20 engage with the recesses or pockets 82.

The resilient or spring characteristics of the undulatory or wave-shaped deformed toothed belt 16 is essentially governed by the material from which the toothed belt 16 is formed but also by the provision of the inserts or insert members 68. It should be readily apparent that the resilient or spring action between the entrainment elements 14 can be achieved with other means or facilities than through the use of the described toothed belt 16. Thus, for instance, there could be deformed into an undulatory or wave-shaped configuration, an endless plastic or spring steel band or tape in the same manner as the toothed belt 16, or else such a band or tape could even possess an undulatory or wave-shaped configuration in the non-assembled state thereof and then can be operatively coupled with the entrainment elements 14. Equally, it would be conceivable to use other resilient or spring elements which, starting from a rest state or condition, could be elastically shortened and elongated. However, such individual resilient or spring elements have the shortcoming that the assembly thereof at the entrainment elements 14 is much more complicated.

It is equally to be understood and appreciated that there can be arranged at the entrainment elements 14, generally most other types of product engaging members which are differently designed than the exemplary described product clamps 56 (FIG. 2) or product gripper elements 88 (FIGS. 4 and 5).

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An endless revolving piece good-transport apparatus, especially for printed products, comprising:
   guide means for guiding entrainment elements;
   a plurality of entrainment elements mounted for revolving movement in said guide means;
   connection means providing drag connections for intercoupling said entrainment elements with one another;
   said entrainment elements moving through a conveying-active path along said guide means in a predetermined direction of movement;
   said conveying-active path having a starting region and a terminal region;
   said entrainment elements taking over the infed piece goods at a product take-over operating cadence at said starting region of said conveying-active path;
   said entrainment elements delivering the piece goods at a product delivery operating cadence at the terminal region of said conveying-active path;
   respective drive means for driving said entrainment elements at said starting region and at said terminal region of said conveying-active path and for controlling the mutual position of said entrainment elements with respect to one another in order to regulate the product take-over operating cadence independent of the product delivery operating cadence from one another; and
   said connection means providing said drag connections between the entrainment elements comprising resilient means which can be shortened and extended.

2. The endless revolving piece good-transport apparatus as defined in claim 1, further including:
   means for slidably mounting said entrainment elements in said guide means.

3. The endless revolving piece good-transport apparatus as defined in claim 1, wherein:
said resilient means comprise at least one spring element; and
said at least one spring element comprising at least one bending spring.

4. The endless revolving piece good-transport apparatus as defined in claim 3, wherein:
said at least one bending spring possesses between two neighboring entrainment elements a bent configuration having at least one apex.

5. The endless revolving piece good-transport apparatus as defined in claim 3, wherein:
said at least one bending spring comprises a sequence of bending springs;
each said bending spring extending between two neighboring ones of said plurality of entrainment elements; and
each said bending spring comprises a section of an endless band;
attachment means for securing said bending springs to said entrainment elements; and
said attachment means imparting a substantially wave-shaped configuration to said bending springs of said endless band when secured to said entrainment elements.

6. The endless revolving piece good-transport apparatus as defined in claim 5, wherein:
said endless band comprises an elastomeric band provided with insert means.

7. The endless revolving piece good-transport apparatus as defined in claim 6, wherein:
said elastomeric band comprises a toothed belt.

8. The endless revolving piece good-transport apparatus as defined in claim 1, wherein:
each of said drive means comprising at least one cam disc acting upon said entrainment elements.

9. The endless revolving piece good-transport apparatus as defined in claim 8, wherein:
said guide means extend at a radial spacing about said cam discs in order to retain the entrainment elements in engagement with said cam discs.

10. The endless revolving piece good-transport apparatus as defined in claim 9, wherein:
each of said cam discs possesses a substantially sawtooth-shaped circumferential profile providing steep flanks; and
each of said steep flanks defining leading flanks with respect to a predetermined direction of rotation of the associated cam disc.

11. The endless revolving piece good-transport apparatus as defined in claim 10, wherein:
each of said cam discs is provided with recess means having a predetermined configuration and arranged directly downstream of each steep flank as viewed with respect to the predetermined direction of rotation of each said cam disc;
each of said entrainment elements being provided with an entrainment member;
each said entrainment member having a substantially complimentary configuration with respect to said predetermined configuration of the recess means; and
each of said recess means receiving the complimentary configured entrainment member provided at each entrainment element.

12. The endless revolving piece good-transport apparatus as defined in claim 10, wherein:
a respective cam disc and entrainment member are arranged at opposite sides of the resilient means.

13. An endless revolving product transport apparatus, comprising:
guide means for guiding entrainment elements;
a plurality of entrainment elements mounted for movement in said guide means;
connection means providing drag connections for securing said entrainment elements to one another;
said entrainment elements moving through a conveying-active path along said guide means in a predetermined direction of movement;
said conveying-active path having a starting region and a terminal region;
said entrainment elements taking over infed products at a product take-over operating cadence at said starting region of said conveying-active path;
said entrainment elements delivering the products at a product delivery operating cadence at the terminal region of said conveying-active path;
respective drive means for driving said entrainment elements at said starting region and at said terminal region of said conveying-active path and for controlling the mutual position of said entrainment elements with respect to one another in order to regulate the product take-over operating cadence independent of the product delivery operating cadence from one another; and
said connection means providing said drag connections between the entrainment elements comprising shortenable and extensible elastic spring means.

* * * * *